United States Patent
Moriuchi et al.

(10) Patent No.: US 11,791,488 B2
(45) Date of Patent: *Oct. 17, 2023

(54) FLOW BATTERY SYSTEM

(71) Applicant: Sumitomo Electric Industries, Ltd., Osaka (JP)

(72) Inventors: Kiyoaki Moriuchi, Osaka (JP); Ryojun Sekine, Osaka (JP); Takayasu Sugihara, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/543,771

(22) Filed: Dec. 7, 2021

(65) Prior Publication Data

US 2022/0093955 A1    Mar. 24, 2022

Related U.S. Application Data

(63) Continuation-in-part of application No. 16/319,186, filed as application No. PCT/JP2017/018548 on May 17, 2017, now Pat. No. 11,233,253.

(30) Foreign Application Priority Data

Jul. 26, 2016   (JP) .................................. 2016-146799

(51) Int. Cl.
  *H01M 8/18*    (2006.01)
(52) U.S. Cl.
  CPC .... *H01M 8/188* (2013.01); *H01M 2300/0008* (2013.01); *H01M 2300/0011* (2013.01)

(58) Field of Classification Search
  CPC ......... H01M 8/188; H01M 2300/0008; H01M 2300/0011; H01M 8/18; Y02E 60/50
  See application file for complete search history.

(56) References Cited

U.S. PATENT DOCUMENTS

| | | |
|---|---|---|
| 2010/0143781 A1 | 6/2010 | Keshavarz et al. |
| 2015/0228997 A1 | 8/2015 | Dong et al. |
| | (Continued) | |

FOREIGN PATENT DOCUMENTS

| | | |
|---|---|---|
| EP | 2 876 717 A1 | 5/2015 |
| JP | 2002-367657 A | 12/2002 |
| JP | 2007-311209 A | 11/2007 |
| | (Continued) | |

OTHER PUBLICATIONS

English-language translation of related International Application No. PCT/JP2017/018549, 46 pages.

*Primary Examiner* — Ula C Ruddock
*Assistant Examiner* — Sarika Gupta
(74) *Attorney, Agent, or Firm* — XSENSUS LLP (57) ABSTRACT

Provided is an electrolyte for a flow battery, the electrolyte being supplied to a flow battery, in which a total concentration of ions of elements of groups 1 to 8 and ions of elements of groups 13 to 16 in the fifth period of the periodic table, and ions of elements of groups 1, 2, and 4 to 8 and ions of elements of groups 13 to 15 in the sixth period of the periodic table, the ions being impurity element ions involved in generation of a gas containing elemental hydrogen, may be 610 mg/L or less and a concentration of vanadium ions may be 1 mol/L or more and 3 mol/L or less.

20 Claims, 1 Drawing Sheet

(56) References Cited

U.S. PATENT DOCUMENTS

2015/0380760 A1 12/2015 Spaziante et al.
2017/0229728 A1 8/2017 Dong et al.

FOREIGN PATENT DOCUMENTS

| JP | 2015-232960 A | 12/2015 | |
|---|---|---|---|
| JP | 2016-031790 A | 3/2016 | |
| JP | 6153100 B1 | 6/2017 | |
| WO | 2013/054921 A1 | 4/2013 | |
| WO | 2014/203409 A1 | 12/2014 | |
| WO | 2014/203410 A1 | 12/2014 | |
| WO | WO-2014203409 A1 * | 12/2014 | ............ H01M 8/188 |
| WO | 2015/019972 A1 | 2/2015 | |
| WO | WO-2015019972 A1 * | 2/2015 | ............ H01M 8/188 |
| WO | 2016/017393 A1 | 2/2016 | |

* cited by examiner

FLOW BATTERY SYSTEM

CROSS-REFERENCE TO RELATED APPLICATIONS

This application is a continuation in part of U.S. application Ser. No. 16/319,186, filed Jan. 18, 2019, which is based on PCT filing PCT/JP2017/018548, filed May 17, 2017, and claims priority to Japanese Application No. 2016-146799, filed Jul. 26, 2016, the entire contents of each are incorporated herein by reference.

TECHNICAL FIELD

The present invention relates to an electrolyte for a flow battery, and a flow battery system.

BACKGROUND ART

Some secondary battery (flow battery) systems carry out a battery reaction using an electrolyte. An example of the electrolyte used in such a flow battery system is an aqueous solution, such as an aqueous sulfuric acid solution, containing, as an active material, ions whose valence is changed by oxidation-reduction (paragraph 0023 of the specification of PTL 1, and PTL 2). PTL 1 and PTL 2 disclose an vanadium-based electrolyte that contains vanadium ions as an active material for both positive and negative electrodes.

CITATION LIST

Patent Literature

PTL 1: Japanese Unexamined Patent Application Publication No. 2002-367657
PTL 2: Japanese Unexamined Patent Application Publication No. 2007-311209

SUMMARY OF INVENTION

An electrolyte for a flow battery according to the present disclosure is
  an electrolyte for a flow battery, the electrolyte being supplied to a flow battery,
  in which a total concentration of ions of elements of groups 1 to 8 and ions of elements of groups 13 to 16 in the fifth period of the periodic table, and ions of elements of groups 1, 2, and 4 to 8 and ions of elements of groups 13 to 15 in the sixth period of the periodic table, the ions being impurity element ions involved in generation of a gas containing elemental hydrogen, is 610 mg/L or less,
  a concentration of vanadium ions is 1 mol/L or more and 3 mol/L or less,
  a concentration of free sulfuric acid is 1 mol/L or more and 4 mol/L or less,
  a concentration of phosphoric acid is $1.0 \times 10^{-4}$ mol/L or more and $7.1 \times 10^{-1}$ mol/L or less,
  a concentration of ammonium is 20 mg/L or less,
  a concentration of silicon is 40 mg/L or less, and
  when a charging and discharging test is performed by circulating and supplying the electrolyte to the flow battery under conditions below, a generation rate of hydrogen is less than 10 cc/h/m$^2$ and a generation rate of hydrogen sulfide is less than $5.0 \times 10^{-3}$ cc/h/m$^2$, the hydrogen and the hydrogen sulfide being generated in a negative electrode of the flow battery during charging and discharging.

(Charge and Discharge Conditions)
Charge and discharge method: continuous charging and discharging at constant current
Current density: 70 (mA/cm$^2$)
End-of-charge voltage: 1.55 (V)/cell
End-of-discharge voltage: 1.00 (V)/cell
Temperature: room temperature (25° C.)
A flow battery system according to the present disclosure includes the electrolyte for a flow battery according to the present disclosure and a flow battery to which the electrolyte for a flow battery is supplied.

DESCRIPTION OF EMBODIMENTS

Problem to be Solved by the Present Disclosure

In flow battery systems, a gas can be generated by, for example, a side reaction of a battery reaction. For example, when the electrolyte is the aqueous sulfuric acid solution described above, hydrogen, hydrogen sulfide, and the like can be generated in the negative electrode (paragraph 0011 of the specification of PTL 2). PTL 2 discloses that a gas collected in a tank is cleaned and then removed. However, it is desirable that the amount of gas to be generated can be reduced.

In view of this, an object is to provide an electrolyte for a flow battery in which the generation of a gas can be reduced.

Another object is to provide a flow battery system including the electrolyte for a flow battery.

Advantageous Effects of the Present Disclosure

According to the electrolyte for a flow battery of the present disclosure, gas generation can be reduced.
According to the flow battery system of the present disclosure, the amount of gas generated is small.

DESCRIPTION OF EMBODIMENTS OF THE PRESENT INVENTION

In order to reduce gas generation due to, for example, a side reaction of a battery reaction, the inventors of the present invention have particularly focused on an electrolyte for a flow battery (hereinafter, also simply referred to as an "electrolyte") used in a flow battery and conducted studies. Here, the electrolyte can contain impurity ions, such as impurity element ions and impurity compound ions, besides active material ions. The impurity ions in the electrolyte are mainly derived from various sources such as ingredients of the electrolyte, materials and members used in steps of producing the electrolyte, and members used for, for example, transporting and storing the electrolyte. It is also conceivable that the impurity ions are derived from members constituting a flow battery system with which the electrolyte can be in contact during operation of the flow battery system. As a result of studies on the types and amounts of such impurity ions and the amounts of gases generated, it has been found that excessively large amounts of specific types of impurity element ions that can be contained in the electrolyte can cause the generation of a gas containing elemental hydrogen (hereinafter also referred to as a "H-containing gas") such as hydrogen or hydrogen sulfide. The present invention is based on these findings. Hereinafter, embodiments of the present invention will be listed and described.

(1) An electrolyte for a flow battery according to an embodiment of the present invention is an electrolyte for a flow battery, the electrolyte being supplied to a flow battery, in which a total concentration of ions of elements of groups 1 to 8 and ions of elements of groups 13 to 16 in the fifth period of the periodic table, and ions of elements of groups 1, 2, and 4 to 8 and ions of elements of groups 13 to 15 in the sixth period of the periodic table, the ions being impurity element ions involved in generation of a gas containing elemental hydrogen, is 610 mg/L or less, a concentration of vanadium ions is 1 mol/L or more and 3 mol/L or less, a concentration of free sulfuric acid is 1 mol/L or more and 4 mol/L or less, a concentration of phosphoric acid is $1.0 \times 10^{-4}$ mol/L or more and $7.1 \times 10^{-1}$ mol/L or less, a concentration of ammonium is 20 mg/L or less, a concentration of silicon is 40 mg/L or less, and when a charging and discharging test is performed by circulating and supplying the electrolyte to the flow battery under conditions below, a generation rate of hydrogen is less than 10 cc/h/m$^2$ and a generation rate of hydrogen sulfide is less than $5.0 \times 10^{-3}$ cc/h/m$^2$, the hydrogen and the hydrogen sulfide being generated in a negative electrode of the flow battery during charging and discharging.

(Charge and Discharge Conditions)

Charge and discharge method: continuous charging and discharging at constant current Current density: 70 (mA/cm$^2$)

End-of-charge voltage: 1.55 (V)/cell

End-of-discharge voltage: 1.00 (V)/cell

Temperature: room temperature (25° C.)

Although the electrolyte for a flow battery (hereinafter, also simply referred to as the "electrolyte") can contain both ions of specific elements in the fifth period and ions of specific elements in the sixth period, the total content of the ions is very low. Therefore, when the electrolyte is used as an electrolyte for a flow battery system, the generation of a gas, in particular, the generation of a H-containing gas in the negative electrode can be reduced and preferably substantially prevented. Accordingly, the electrolyte can contribute to the construction of a flow battery system in which the amount of gas generated by, for example, a side reaction of the battery reaction is small.

The embodiment described above relates to an vanadium-based electrolyte that contains vanadium ions as an active material and mainly includes a solution containing sulfuric acid and phosphoric acid. Since the electrolyte according to the embodiment has a specific composition, the following various advantages can be obtained. 1. The generation of a gas due to a side reaction of the battery reaction is easily reduced; 2. The balance of valences in the positive and negative electrodes is good, and thus good battery characteristics, such as battery efficiency, are obtained; 3. Precipitation of compounds containing an active material element, such as ammonium-vanadium compounds, can be suppressed; and 4. For example, gelation of the electrolyte due to silicon can be suppressed. Accordingly, the embodiment described above contributes to the construction of a flow battery system in which gas generation due to, for example, a side reaction of the battery reaction can be further reduced and precipitation of precipitates containing an active material element derived from active material element ions can also be suppressed, and which has good battery characteristics.

(2) In an embodiment of the electrolyte for a flow battery, a concentration of barium ions, which are impurity element ions involved in generation of a gas containing elemental hydrogen, is 20 mg/L or less.

Even when the electrolyte contains barium ions, which are ions of the element of group 2 in the sixth period of the periodic table, the content of barium ions is very low. Therefore, when the electrolyte is used as an electrolyte for a flow battery system, the generation of a gas, in particular, the generation of a H-containing gas in the negative electrode can be reduced and preferably substantially prevented. Accordingly, the electrolyte can contribute to the construction of a flow battery system in which the amount of gas generated by, for example, a side reaction of the battery reaction is small.

(3) In an embodiment of the electrolyte for a flow battery, a concentration of molybdenum ions, which are impurity element ions involved in generation of a gas containing elemental hydrogen, is 510 mg/L or less.

Even when the electrolyte contains molybdenum ions, which are ions of the element of group 6 in the fifth period of the periodic table, the content of molybdenum ions is very low. Therefore, when the electrolyte is used as an electrolyte for a flow battery system, the generation of a gas, in particular, the generation of a H-containing gas in the negative electrode can be reduced and preferably substantially prevented. Accordingly, the electrolyte can contribute to the construction of a flow battery system in which the amount of gas generated by, for example, a side reaction of the battery reaction is small.

(4) In an embodiment of the electrolyte for a flow battery, a concentration of tungsten ions, which are impurity element ions involved in generation of a gas containing elemental hydrogen, is 30 mg/L or less.

Even when the electrolyte contains tungsten ions, which are ions of the element of group 6 in the sixth period of the periodic table, the content of tungsten ions is very low. Therefore, when the electrolyte is used as an electrolyte for a flow battery system, the generation of a gas, in particular, the generation of a H-containing gas in the negative electrode can be reduced and preferably substantially prevented. Accordingly, the electrolyte can contribute to the construction of a flow battery system in which the amount of gas generated by, for example, a side reaction of the battery reaction is small.

(5) In an embodiment of the electrolyte for a flow battery, a concentration of rhenium ions, which are impurity element ions involved in generation of a gas containing elemental hydrogen, is 5 mg/L or less.

Even when the electrolyte contains rhenium ions, which are ions of the element of group 7 in the sixth period of the periodic table, the content of rhenium ions is very low. Therefore, when the electrolyte is used as an electrolyte for a flow battery system, the generation of a gas, in particular, the generation of a H-containing gas in the negative electrode can be reduced and preferably substantially prevented. Accordingly, the electrolyte can contribute to the construction of a flow battery system in which the amount of gas generated by, for example, a side reaction of the battery reaction is small.

(6) In an embodiment of the electrolyte for a flow battery, a concentration of indium ions, which are impurity element ions involved in generation of a gas containing elemental hydrogen, is 5 mg/L or less.

Even when the electrolyte contains indium ions, which are ions of the element of group 13 in the fifth period of the periodic table, the content of indium ions is very low. Therefore, when the electrolyte is used as an electrolyte for a flow battery system, the generation of a gas, in particular, the generation of a H-containing gas in the negative electrode can be reduced and preferably substantially prevented. Accordingly, the electrolyte can contribute to the construction of a flow battery system in which the amount of gas generated by, for example, a side reaction of the battery reaction is small.

(7) In an embodiment of the electrolyte for a flow battery, a concentration of antimony ions, which are impurity element ions involved in generation of a gas containing elemental hydrogen, is 10 mg/L or less.

Even when the electrolyte contains antimony ions, which are ions of the element of group 15 in the fifth period of the periodic table, the content of antimony ions is very low. Therefore, when the electrolyte is used as an electrolyte for a flow battery system, the generation of a gas, in particular, the generation of a H-containing gas in the negative electrode can be reduced and preferably substantially prevented. Accordingly, the electrolyte can contribute to the construction of a flow battery system in which the amount of gas generated by, for example, a side reaction of the battery reaction is small.

(8) In an embodiment of the electrolyte for a flow battery, a concentration of bismuth ions, which are impurity element ions involved in generation of a gas containing elemental hydrogen, is 20 mg/L or less.

Even when the electrolyte contains bismuth ions, which are ions of the element of group 15 in the sixth period of the periodic table, the content of bismuth ions is very low. Therefore, when the electrolyte is used as an electrolyte for a flow battery system, the generation of a gas, in particular, the generation of a H-containing gas in the negative electrode can be reduced and preferably substantially prevented. Accordingly, the electrolyte can contribute to the construction of a flow battery system in which the amount of gas generated by, for example, a side reaction of the battery reaction is small.

(9) A flow battery system according to an embodiment of the present invention includes the electrolyte for a flow battery according to any one of (1) to (8) above and a flow battery to which the electrolyte for a flow battery is supplied.

According to the flow battery system, since the above-described electrolyte for a flow battery is used, the amount of gas generated by, for example, a side reaction of the battery reaction is small.

DETAILED DESCRIPTION OF EMBODIMENTS OF THE PRESENT INVENTION

Figure 1:
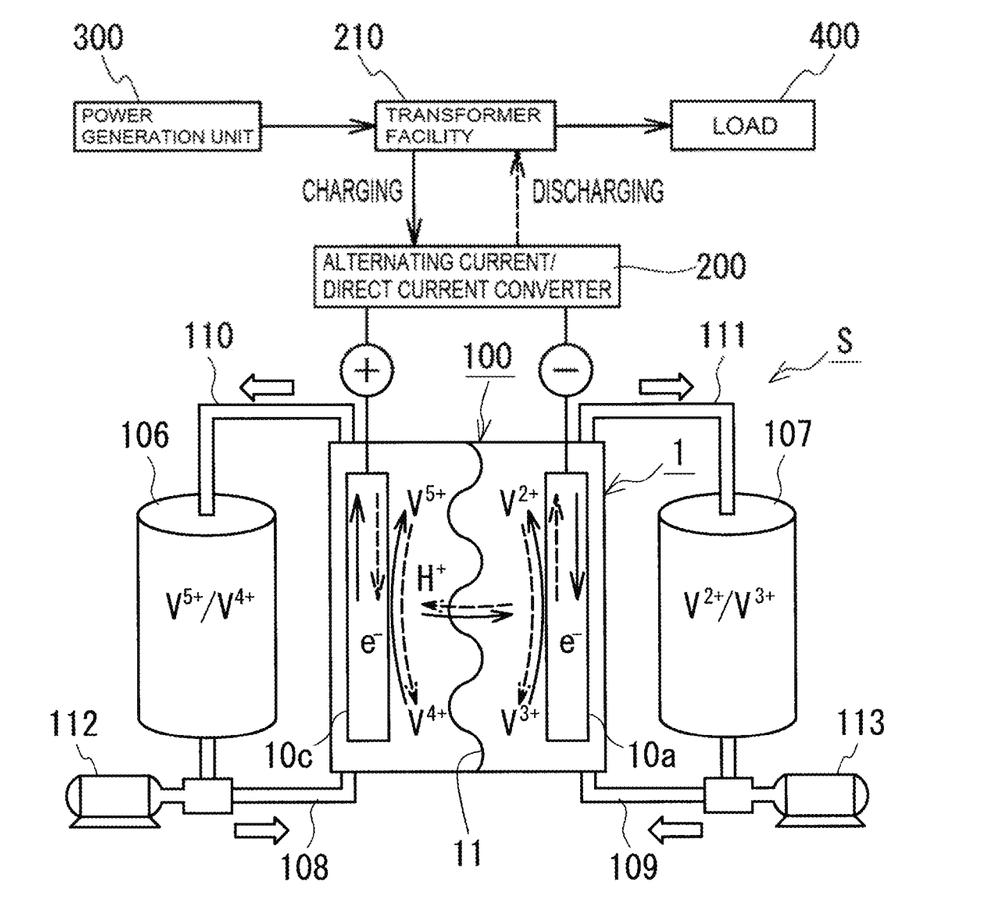
FIG. 1 is an explanatory view illustrating a schematic structure of a flow battery system according to an embodiment and an operating principle of a flow battery.

Hereinafter, electrolytes for flow batteries (hereinafter, also simply referred to as "electrolytes") and a flow battery system according to embodiments of the present invention will be described in more detail. First, a flow battery system according to an embodiment will be described with reference to FIG. 1, and subsequently, electrolytes will be described in detail. In FIG. 1, ions illustrated in a positive electrolyte tank 106 and a negative electrolyte tank 107 are examples of ionic species contained as an active material in an electrolyte, the solid-line arrows indicate charging, and the dashed-line arrows indicate discharging.

Overview of Flow Battery System

A flow battery system S according to an embodiment includes a flow battery 1 and an electrolyte for a flow battery. Here, a circulation mechanism (described later) for suppling the electrolyte to the flow battery 1 is connected to the flow battery 1. The flow battery 1 is typically connected, through an alternating current/direct current converter 200, a transformer facility 210, and the like, to a power generation unit 300 and a load 400 such as a power system or a consumer. The flow battery 1 performs charging by using the power generation unit 300 as a power supply source and performs discharging to the load 400 as a power supply target. Examples of the power generation unit 300 include solar photovoltaic power generators, wind power generators, and other general power plants.

Basic Configuration of Flow Battery

The flow battery 1 includes, as a main component, a battery cell 100 including a positive electrode 10c, a negative electrode 10a, and a membrane 11 disposed between the two electrodes 10c and 10a.

The flow battery 1 is typically used in the form of a cell stack in which a plurality of battery cells 100 are stacked. The cell stack typically has a configuration using a frame assembly that includes a bipolar plate (not shown) having a positive electrode 10c on one surface thereof and a negative electrode 10a on the other surface thereof and a frame body (not shown) formed on an outer periphery of the bipolar plate. A flow path such as a groove through which an electrolyte flows may be formed in the bipolar plate. The frame body has liquid supply holes through which electrolytes for electrodes are supplied to the electrodes disposed on the bipolar plate and liquid drainage holes through which the electrolytes are drained. By stacking a plurality of frame assemblies, the liquid supply holes and the liquid drainage holes form flow ducts for the electrolytes. The ducts are connected to pipes 108 to 111, which will be described later. The cell stack is formed by repeatedly stacking a bipolar plate of a frame assembly, a positive electrode 10c, a membrane 11, a negative electrode 10a, a bipolar plate of another frame assembly, and so on in this order.

Circulation Mechanism

The circulation mechanism includes a positive electrolyte tank 106 that stores a positive electrolyte to be circulated and supplied to the positive electrode 10c, a negative electrolyte tank 107 that stores a negative electrolyte to be circulated and supplied to the negative electrode 10a, pipes 108 and 110 that connect the positive electrolyte tank 106 and the flow battery 1, pipes 109 and 111 that connect the negative electrolyte tank 107 and the flow battery 1, and pumps 112 and 113 that are respectively provided on the pipes 108 and 109 on the upstream side (supply side).

In the flow battery system S, by using a positive electrolyte circulation path including the positive electrolyte tank 106 and the pipes 108 and 110 and a negative electrolyte circulation path including the negative electrolyte tank 107 and the pipes 109 and 111, the positive electrolyte and the negative electrolyte are circulated and supplied to the positive electrode 10c and negative electrode 10a, respectively. As a result of the circulation and supply, charging and discharging are performed in response to valence change reactions of active material ions in the electrolytes for the electrodes. A known configuration can be appropriately used as the basic configuration of the flow battery system S. One feature of the flow battery system S according to the embodiment lies in that the flow battery system S includes, as an electrolyte, any one of electrolytes according to Embodiment 1 to Embodiment 9 described below.

Electrolyte

The electrolytes according to embodiments are ionic solutions that contain ions serving as active materials and are common to existing electrolytes in this respect. One feature of the electrolytes according to the embodiments lies in that although the electrolytes can contain, as impurity ions, specific impurity element ions involved in gas generation due to, for example, a side reaction of a battery reaction, the content of the impurity element ions is very low. First, the specific impurity element ions will be described.

Impurity Element Ions

Embodiment 1

An electrolyte according to Embodiment 1 has a total concentration of ions of 610 mg/L or less, the ions being ions of elements of groups 1 to 8 and ions of elements of groups 13 to 16 in the fifth period of the periodic table, and ions of elements of groups 1, 2, and 4 to 8 and ions of elements of groups 13 to 15 in the sixth period of the periodic table, when the electrolyte contains these ions as impurity element ions involved in gas generation. Since the content (total concentration) of these impurity element ions satisfies the above range, gas generation can be reduced when the flow battery system S is operated using the electrolyte according to Embodiment 1. In particular, the generation of H-containing gases that contain hydrogen, such as hydrogen and hydrogen sulfide, in the negative electrode can be effectively reduced.

The elements of groups 1 to 8 in the fifth period of the periodic table are rubidium (Rb, group 1), strontium (Sr, group 2), yttrium (Y, group 3), zirconium (Zr, group 4), niobium (Nb, group 5), molybdenum (Mo, group 6), technetium (Tc, group 7), and ruthenium (Ru, group 8).

The elements of groups 13 to 16 in the fifth period of the periodic table are indium (In, group 13), tin (Sn, group 14), antimony (Sb, group 15), and tellurium (Te, group 16).

The elements of groups 1, 2, and 4 to 8 in the sixth period of the periodic table are cesium (Cs, group 1), barium (Ba, group 2), hafnium (Hf, group 4), tantalum (Ta, group 5), tungsten (W, group 6), rhenium (Re, group 7), and osmium (Os, group 8).

The elements of groups 13 to 15 in the sixth period of the periodic table are thallium (Tl, group 13), lead (Pb, group 14), and bismuth (Bi, group 15).

Hereinafter, these elements may be collectively referred to as a "gas generation impurity element group".

With a decrease in the total concentration, gas generation can be further reduced, which is preferable. The total concentration is preferably 600 mg/L or less, further 550 mg/L or less, and more preferably 500 mg/L or less. As shown in the test example which will be described later, it is considered to be preferable that, with regard to at least an unused electrolyte, the total concentration satisfies the range described above. Although the total concentration is preferably 0 (zero), the upper limit described above is specified as a permissible amount in which gas generation can be sufficiently reduced.

As described above, with a decrease in the total concentration, gas generation can be further reduced. However, a gas is generated substantially in an amount that is acceptable to the flow battery system S. This gas can also be used as, for example, fuel for fuel cells. For example, when the total concentration is more than 550 mg/L and 610 mg/L or less, further, 570 mg/L or more and 610 mg/L or less, and in particular, 580 mg/L or more and 610 mg/L or less, the gas can be utilized. Specifically, when the total concentration is more than 550 mg/L and 610 mg/L or less, the electrolyte according to Embodiment 1 can be used both for the battery reaction and the gas generation. When the total concentration is 550 mg/L or less, and further, 500 mg/L or less, the electrolyte can be suitably used for the battery reaction.

It has been found that even when the total concentration of ions of the elements of the gas generation impurity element group is low, regarding ions of specific elements among the ions of the elements of the gas generation impurity element group, excessively high contents of the ions of the specific elements easily cause gas generation. In view of this, regarding ions of the specific elements of the gas generation impurity element group, the contents of the ions are specified as described below.

Embodiment 2

An electrolyte according to Embodiment 2 has a barium ion concentration of 20 mg/L or less when the electrolyte contains barium ions as impurity element ions involved in gas generation. In particular, since the content of barium ions, among the impurity ions that can be contained in the electrolyte, satisfies the above range, gas generation can be reduced when the flow battery system S is operated using the electrolyte according to Embodiment 2. In particular, the generation of a H-containing gas, in particular, hydrogen sulfide gas, in the negative electrode can be effectively reduced.

With a decrease in the concentration of barium ions, gas generation can be further reduced, which is preferable. The concentration of barium ions is preferably 18 mg/L or less, further 16 mg/L or less, and more preferably 10 mg/L or less. As shown in the test example which will be described later, it is considered to be preferable that, with regard to at least an unused electrolyte, the concentration of barium ions satisfies the above range. Although the concentration of barium ions is preferably 0 (zero), the upper limit described above is specified as a permissible amount in which gas generation can be sufficiently reduced.

As described above, with a decrease in the concentration of barium ions, gas generation can be further reduced. However, a gas is generated substantially in an amount that is acceptable to the flow battery system S. For example, when the concentration of barium ions is more than 15 mg/L and 20 mg/L or less, further, 16 mg/L or more and 20 mg/L or less, and in particular, 17 mg/L or more and 20 mg/L or less, the gas can also be used as, for example, fuel for fuel cells. Specifically, when the concentration of barium ions in the electrolyte according to Embodiment 2 is more than 15 mg/L and 20 mg/L or less, the electrolyte can be used both for the battery reaction and the gas generation. When the concentration of barium ions is 15 mg/L or less, and further, 10 mg/L or less, the electrolyte can be suitably used for the battery reaction.

Embodiment 3

An electrolyte according to Embodiment 3 has a molybdenum ion concentration of 510 mg/L or less when the electrolyte contains molybdenum ions as impurity element ions involved in gas generation. In particular, since the content of molybdenum ions, among the impurity ions that can be contained in the electrolyte, satisfies the above range, gas generation can be reduced when the flow battery system S is operated using the electrolyte according to Embodiment 3. In particular, the generation of a H-containing gas, in particular, hydrogen sulfide gas, in the negative electrode can be effectively reduced.

With a decrease in the concentration of molybdenum ions, gas generation can be further reduced, which is preferable. The concentration of molybdenum ions is preferably 500 mg/L or less, further, 495 mg/L or less, 450 mg/L or less, and more preferably 400 mg/L or less. As shown in the test example which will be described later, it is considered to be preferable that, with regard to at least an unused electrolyte, the concentration of molybdenum ions satisfies the range described above. Although the concentration of molybdenum ions is preferably 0 (zero), the upper limit described above is specified as a permissible amount in which gas generation can be sufficiently reduced.

As described above, with a decrease in the concentration of molybdenum ions, gas generation can be further reduced. However, a gas is generated substantially in an amount that is acceptable to the flow battery system S. For example, when the concentration of molybdenum ions is more than 480 mg/L and 510 mg/L or less, further, 490 mg/L or more and 510 mg/L or less, and in particular, 500 mg/L or more and 510 mg/L or less, the gas can also be used as, for example, fuel for fuel cells. Specifically, when the concentration of molybdenum ions in the electrolyte according to Embodiment 3 is more than 480 mg/L and 510 mg/L or less, the electrolyte can be used both for the battery reaction and the gas generation. When the concentration of molybdenum ions is 480 mg/L or less, and further, 400 mg/L or less, the electrolyte can be suitably used for the battery reaction.

Embodiment 4

An electrolyte according to Embodiment 4 has a tungsten ion concentration of 30 mg/L or less when the electrolyte contains tungsten ions as impurity element ions involved in gas generation. In particular, since the content of tungsten ions, among the impurity ions that can be contained in the electrolyte, satisfies the above range, gas generation can be reduced when the flow battery system S is operated using the electrolyte according to Embodiment 4. In particular, the generation of a H-containing gas, in particular, hydrogen sulfide gas, in the negative electrode can be effectively reduced.

With a decrease in the concentration of tungsten ions, gas generation can be further reduced, which is preferable. The concentration of tungsten ions is preferably 29 mg/L or less, further 26 mg/L or less, and more preferably 20 mg/L or less. As shown in the test example which will be described later, it is considered to be preferable that, with regard to at least an unused electrolyte, the concentration of tungsten ions satisfies the range described above. Although the concentration of tungsten ions is preferably 0 (zero), the upper limit described above is specified as a permissible amount in which gas generation can be sufficiently reduced.

As described above, with a decrease in the concentration of tungsten ions, gas generation can be further reduced. However, a gas is generated substantially in an amount that is acceptable to the flow battery system S. For example, when the concentration of tungsten ions is more than 26 mg/L and 30 mg/L or less, further, 27 mg/L or more and 30 mg/L or less, and in particular, 28 mg/L or more and 30 mg/L or less, the gas can also be used as, for example, fuel for fuel cells. Specifically, when the concentration of tungsten ions in the electrolyte according to Embodiment 4 is more than 26 mg/L and 30 mg/L or less, the electrolyte can be used both for the battery reaction and the gas generation. When the concentration of tungsten ions is 26 mg/L or less, and further, 20 mg/L or less, the electrolyte can be suitably used for the battery reaction.

Embodiment 5

An electrolyte according to Embodiment 5 has a rhenium ion concentration of 5 mg/L or less when the electrolyte contains rhenium ions as impurity element ions involved in gas generation. In particular, since the content of rhenium ions, among the impurity ions that can be contained in the electrolyte, satisfies the above range, gas generation can be reduced when the flow battery system S is operated using the electrolyte according to Embodiment 5. In particular, the generation of a H-containing gas, in particular, hydrogen gas, in the negative electrode can be effectively reduced.

With a decrease in the concentration of rhenium ions, gas generation can be further reduced, which is preferable. The concentration of rhenium ions is preferably 4.8 mg/L or less, further 4.6 mg/L or less, and more preferably 4 mg/L or less. As shown in the test example which will be described later, it is considered to be preferable that, with regard to at least an unused electrolyte, the concentration of rhenium ions satisfies the range described above. Although the concentration of rhenium ions is preferably 0 (zero), the upper limit described above is specified as a permissible amount in which gas generation can be sufficiently reduced.

As described above, with a decrease in the concentration of rhenium ions, gas generation can be further reduced. However, a gas is generated substantially in an amount that is acceptable to the flow battery system S. For example, when the concentration of rhenium ions is more than 4.6 mg/L and 5 mg/L or less, further, 4.7 mg/L or more and 5 mg/L or less, and in particular, 4.8 mg/L or more and 5 mg/L or less, the gas can also be used as, for example, fuel for fuel cells. Specifically, when the concentration of rhenium ions in the electrolyte according to Embodiment 5 is more than 4.6 mg/L and 5 mg/L or less, the electrolyte can be used both for the battery reaction and the gas generation. When the concentration of rhenium ions is 4.6 mg/L or less, and further, 4.0 mg/L or less, the electrolyte can be suitably used for the battery reaction.

Embodiment 6

An electrolyte according to Embodiment 6 has an indium ion concentration of 5 mg/L or less when the electrolyte contains indium ions as impurity element ions involved in gas generation. In particular, since the content of indium ions, among the impurity ions that can be contained in the electrolyte, satisfies the above range, gas generation can be reduced when the flow battery system S is operated using the electrolyte according to Embodiment 6. In particular, the generation of a H-containing gas in the negative electrode can be effectively reduced.

With a decrease in the concentration of indium ions, gas generation can be further reduced, which is preferable. The concentration of indium ions is preferably 4.8 mg/L or less, further 4.6 mg/L or less, and more preferably 4 mg/L or less. As shown in the test example which will be described later, it is considered to be preferable that, with regard to at least an unused electrolyte, the concentration of indium ions satisfies the range described above. Although the concentration of indium ions is preferably 0 (zero), the upper limit described above is specified as a permissible amount in which gas generation can be sufficiently reduced.

As described above, with a decrease in the concentration of indium ions, gas generation can be further reduced. However, a gas is generated substantially in an amount that is acceptable to the flow battery system S. For example, when the concentration of indium ions is more than 4.6 mg/L and 5 mg/L or less, further, 4.7 mg/L or more and 5 mg/L or less, and in particular, 4.8 mg/L or more and 5 mg/L or less, the gas can also be used as, for example, fuel for fuel cells. Specifically, when the concentration of indium ions in the electrolyte according to Embodiment 6 is more than 4.6 mg/L and 5 mg/L or less, the electrolyte can be used both for the battery reaction and the gas generation. When the concentration of indium ions is 4.6 mg/L or less, and further, 4.0 mg/L or less, the electrolyte can be suitably used for the battery reaction.

Embodiment 7

An electrolyte according to Embodiment 7 has an antimony ion concentration of 10 mg/L or less when the electrolyte contains antimony ions as impurity element ions involved in gas generation. In particular, since the content of antimony ions, among the impurity ions that can be contained in the electrolyte, satisfies the above range, gas generation can be reduced when the flow battery system S is operated using the electrolyte according to Embodiment 7. In particular, the generation of a H-containing gas in the negative electrode can be effectively reduced.

With a decrease in the concentration of antimony ions, gas generation can be further reduced, which is preferable. The concentration of antimony ions is preferably 9 mg/L or less, further 8 mg/L or less, and more preferably 6 mg/L or less. As shown in the test example which will be described later, it is considered to be preferable that, with regard to at least an unused electrolyte, the concentration of antimony ions satisfies the range described above. Although the concentration of antimony ions is preferably 0 (zero), the upper limit described above is specified as a permissible amount in which gas generation can be sufficiently reduced.

As described above, with a decrease in the concentration of antimony ions, gas generation can be further reduced. However, a gas is generated substantially in an amount that is acceptable to the flow battery system S. For example, when the concentration of antimony ions is more than 7 mg/L and 10 mg/L or less, further, 8 mg/L or more and 10 mg/L or less, and in particular, 9 mg/L or more and 10 mg/L or less, the gas can also be used as, for example, fuel for fuel cells. Specifically, when the concentration of antimony ions in the electrolyte according to Embodiment 7 is more than 7 mg/L and 10 mg/L or less, the electrolyte can be used both for the battery reaction and the gas generation. When the concentration of antimony ions is 7 mg/L or less, and further, 6 mg/L or less, the electrolyte can be suitably used for the battery reaction.

Embodiment 8

An electrolyte according to Embodiment 8 has a bismuth ion concentration of 20 mg/L or less when the electrolyte contains bismuth ions as impurity element ions involved in gas generation. In particular, since the content of bismuth ions, among the impurity ions that can be contained in the electrolyte, satisfies the above range, gas generation can be reduced when the flow battery system S is operated using the electrolyte according to Embodiment 8. In particular, the generation of a H-containing gas in the negative electrode can be effectively reduced.

With a decrease in the concentration of bismuth ions, gas generation can be further reduced, which is preferable. The concentration of bismuth ions is preferably 19 mg/L or less, further 16 mg/L or less, and more preferably 15 mg/L or less. As shown in the test example which will be described later, it is considered to be preferable that, with regard to at least an unused electrolyte, the concentration of bismuth ions satisfies the range described above. Although the concentration of bismuth ions is preferably 0 (zero), the upper limit described above is specified as a permissible amount in which gas generation can be sufficiently reduced.

As described above, with a decrease in the concentration of bismuth ions, gas generation can be further reduced. However, a gas is generated substantially in an amount that is acceptable to the flow battery system S. For example, when the concentration of bismuth ions is more than 16 mg/L and 20 mg/L or less, further, 17 mg/L or more and 20 mg/L or less, and in particular, 18 mg/L or more and 20 mg/L or less, the gas can also be used as, for example, fuel for fuel cells. Specifically, when the concentration of bismuth ions in the electrolyte according to Embodiment 8 is more than 16 mg/L and 20 mg/L or less, the electrolyte can be used both for the battery reaction and the gas generation. When the concentration of bismuth ions is 16 mg/L or less, and further, 15 mg/L or less, the electrolyte can be suitably used for the battery reaction.

Embodiment 9

An electrolyte according to Embodiment 9 satisfies all the conditions of Embodiment 1 to Embodiment 8 described above. When the flow battery system S is operated using the electrolyte according to Embodiment 9, the generation of a gas, in particular, the generation of a H-containing gas in the negative electrode can be more effectively reduced.

Method for Reducing Impurity Element Ions

In order to reduce the concentrations of ions of elements that can be present in the electrolyte, the elements belonging to the gas generation impurity element group, for example, the following measures can be used.

(1) In the process for producing the electrolyte, ingredients (such as an active material and a solvent) that have low contents of the elements of the gas generation impurity element group, and preferably do not contain the elements, are used.

(2) As the members used in the process for producing the electrolyte, members whose components have low contents of the elements of the gas generation impurity element group, and preferably do not contain the elements, are used.

(3) As the members used in the process for, for example, transporting and storing the electrolyte (such as a transport tank and a storage tank), members whose components have low contents of the elements of the gas generation impurity element group, and preferably do not contain the elements, are used.

(4) The electrolyte is subjected to a removal operation to remove ions of the elements of the gas generation impurity element group, which will be described later.

(5) As the members that can be in contact with the electrolyte, among the members constituting the flow battery system S, members whose components have low contents of the elements of the gas generation impurity element group, and preferably do not contain the elements, are used.

The removal operation in (4) above can be performed by using various methods capable of removing element ions, such as coagulating sedimentation, solvent extraction, filtration with an ion-exchange resin or a chelate resin, electrolytic deposition, and membrane separation. Any known method may be used. In particular, in filtration with a chelate resin, specific element ions can be selectively filtered by adjusting, for example, physical properties of the chelate resin and the pH of the electrolyte. This filtration can be performed by passing the electrolyte through, for example, a filter made of the chelate resin or a column filled with the chelate resin in the form of beads. Through this removal operation, among ions of the elements of the gas generation impurity element group, the ions being present in the electrolyte, a plurality of element ions may be removed at the same time in some cases.

The removal operation described above can be performed at any time. Specifically, the removal operation may be performed not only before the operation, that is, before an electrolyte is supplied to the flow battery system S. For example, in a waiting period or a stop period during the operation of the system S, components in the electrolyte may be analyzed, and the removal operation may be performed on the basis of the results of the analysis. In such a manner, the concentrations of ions of the elements of the gas generation impurity element group can be maintained within specific ranges not only before the operation but also during the operation of the system S. Consequently, gas generation is unlikely to occur even when the system S is operated over a long period of time.

Active Material

The electrolyte according to an embodiment can contain various active materials. Examples of the electrolyte include an vanadium-based electrolyte containing vanadium ions as an active material for both electrodes (refer to FIG. 1), an iron-chromium-based electrolyte containing iron ions as a positive electrode active material and chromium ions as a negative electrode active material, a manganese-titanium-based electrolyte (two-separate-electrolyte type) containing manganese ions as a positive electrode active material and titanium ions as a negative electrode active material, and a manganese-titanium-based electrolyte (one-common-electrolyte type) containing manganese ions and titanium ions for both electrodes. In particular, there is a possibility that the vanadium-type electrolyte contains an element of the gas generation impurity element group in, for example, the process for producing the electrolyte, and therefore, it is desirable to perform the removal operation described in (4) above or the like, as required.

In the case where the electrolyte according to an embodiment is an vanadium-based electrolyte, the concentration of vanadium ions in each of the positive electrolyte and the negative electrolyte is preferably 1 mol/L or more and 3 mol/L or less, 1.2 mol/L or more and 2.5 mol/L or less, and more preferably 1.5 mol/L or more and 1.9 mol/L or less. The effect thereof will be described later.

In the case where the electrolyte according to an embodiment is an vanadium-based electrolyte, vanadium ions preferably have an average valence of 3.3 or more and 3.7 or less, and further, 3.4 or more and 3.6 or less. In this case, a good balance of valences in two electrodes is achieved, the battery reaction can be conducted satisfactorily, and good battery characteristics, such as battery efficiency and energy density, are obtained. Furthermore, because of the good balance of valences, the occurrence of a side reaction of the battery reaction is easily reduced, and gas generation due to the side reaction is easily reduced.

Solvent and Others

The electrolyte according to an embodiment may be an acid solution containing the active material, in particular, an aqueous acid solution containing the active material. The acid solution may contain, for example, at least one acid or acid salt selected from sulfuric acid ($H_2SO_4$), $K_2SO_4$, $Na_2SO_4$, phosphoric acid ($H_3PO_4$), $H_4P_2O_7$, $K_2HPO_4$, $Na_3PO_4$, $K_3PO_4$, nitric acid ($HNO_3$), $KNO_3$, hydrochloric acid (HCl), and $NaNO_3$. Alternatively, the electrolyte may be an organic acid solution.

In the case where the electrolyte according to an embodiment is an vanadium-based electrolyte which is a sulfuric acid solution containing phosphoric acid, preferably, the concentration of vanadium ions satisfies the specific range described above, the concentration of free sulfuric acid is 1 mol/L or more and 4 mol/L or less, the concentration of phosphoric acid is $1.0 \times 10^{-4}$ mol/L or more and $7.1 \times 10^{-1}$ mol/L or less, the concentration of ammonium is 20 mg/L or less, and the concentration of silicon (Si) is 40 mg/L or less.

When the concentration of vanadium ions and the concentration of free sulfuric acid are in the ranges described above, an electrolyte having the good balance of valences can be provided.

In the combination of the concentration of vanadium ions, the concentration of free sulfuric acid, and the concentration of phosphoric acid that satisfy the specific ranges described above, precipitates containing the active material element, such as vanadium compounds, are unlikely to precipitate, and good battery performance can be maintained over a long period of time.

When the concentration of ammonium is in the specific range described above, precipitation of ammonium-vanadium compounds among the vanadium compounds is easily suppressed.

When the concentration of silicon is in the specific range described above, the occurrence of a phenomenon that can adversely affect the membrane 11 can be suppressed.

In this embodiment, in addition to the effect of suppressing the generation of a gas derived from impurity element ions, a reduction in the generation of precipitates derived from active material element ions can also be achieved, and the battery reaction can be satisfactorily conducted.

The concentration of free sulfuric acid is more preferably 1.5 mol/L or more and 3.5 mol/L or less. The concentration of phosphoric acid is more preferably $1.0 \times 10^{-3}$ mol/L or more and $3.5 \times 10^{-1}$ mol/L or less. The concentration of ammonium is more preferably 10 mg/L or less. The concentration of silicon is more preferably 30 mg/L or less. In order to decrease the concentration of ammonium and the concentration of silicon, a known method such as filtration using a filter (refer to, for example, PTL 1) can be used.

Use

The flow battery system S according to an embodiment can be used as a storage battery, with respect to natural energy power generation, such as solar photovoltaic power generation or wind power generation, for the purpose of stabilizing fluctuation of power output, storing generated power during oversupply, leveling load, and the like. Furthermore, the flow battery system S according to an embodiment can be provided in a general power plant and used as a storage battery as countermeasures against momentary voltage drop/power failure and for the purpose of leveling load. The electrolytes according to Embodiment 1 to Embodiment 9 can be used in the flow battery system described above. The electrolytes according to Embodiment 1 to Embodiment 9 can also be used as electrolytes for electrolyzers and electrolyzer systems in which the generation of hydrogen and hydrogen sulfide is desired to be suppressed.

Test Example 1

Various electrolytes were prepared, and a charging and discharging test was performed by circulating and supplying each of the electrolytes to a flow battery to examine the state of gas generation.

In this test, a flow battery system including, as a flow battery, a cell stack in which a plurality of battery cells were stacked and a circulation mechanism for circulating and supplying electrolytes to the cell stack was constructed (refer to FIG. 1).

Each of the battery cells of the cell stack included electrodes having an electrode area of 500 $cm^2$ and made of carbon felt, a membrane, and a frame assembly.

This flow battery system has an output capacity of 1 kW×5 hours.

The electrolytes prepared in this test were aqueous sulfuric acid solutions containing vanadium ions as an active material for both electrodes, that is, vanadium-based electrolytes. The amount of electrolyte prepared for each sample was 175 liters for the positive electrolyte and 175 liters for the negative electrolyte (350 liters in total for the positive and negative electrodes). The electrolytes of the individual samples contained the following components in common.

Concentrations in electrolyte (common to all samples)
Concentration of vanadium ions: 1.7 mol/L
Average valence of vanadium ions: 3.5
Concentration of free sulfuric acid: 2.0 mol/L
Concentration of phosphoric acid: 0.14 mol/L ($1.4 \times 10^{-1}$ mol/L)
Concentration of ammonium: 20 mg/L or less
Concentration of silicon: 40 mg/L or less The electrolytes of Sample Nos. 1-1 to 1-10 were each passed through a column packed with a chelate resin to adjust the concentrations of impurity element ions, and then subjected to concentration measurement which will be described below.

The electrolytes of Sample Nos. 1-101 to 1-107 were each passed through a column packed with a chelate resin different from that of Sample No. 1-1, or subjected to another method for removing ions, or subjected to addition of particular impurity element ions to adjust the concentrations of impurity element ions, and then subjected to concentration measurement which will be described below.

The electrolyte of Sample No. 1-108 was not subjected to the adjustment of the concentrations of impurity element ions.

Before the charging and discharging test which will be described below, the prepared electrolytes of the individual samples were subjected to component analysis. Regarding the elements of groups 1 to 8 and the elements of groups 13 to 16 in the fifth period of the periodic table, and the elements of groups 1, 2, and 4 to 8 and the elements of groups 13 to 15 in the sixth period of the periodic table, the concentrations (mg/L) of ions of the individual elements were measured. Table 1 shows the results. The concentrations were measured using an ICP mass spectrometer (manufactured by Agilent Technologies, Inc., Agilent 7700x ICP-MS). The detection limit of the ICP mass spectrometer is 0.001 mg/L (1 ppb). In Table 1, "0.001>" indicates that the measured concentration of impurity element ions is less than the detection limit.

The prepared electrolytes of the samples were each circulated and supplied to the flow battery prepared above, and a charging and discharging test was performed under the following conditions. Here, a gas generated in the negative electrode during charging and discharging was collected to analyze the components. A hydrogen generation rate and a hydrogen sulfide generation rate were examined to thereby examine the state of gas generation. When the hydrogen generation rate was less than 10 $cc/h/m^2$, it was evaluated that the generation did not occur. When the hydrogen generation rate was 10 $cc/h/m^2$ or more, it was evaluated that the generation occurred. When the hydrogen sulfide generation rate was less than $5.0 \times 10^{-3}$ $cc/h/m^2$, it was evaluated that the generation did not occur. When the hydrogen sulfide generation rate was $5.0 \times 10^{-3}$ $cc/h/m^2$ or more, it was evaluated that the generation occurred. Table 1 shows the evaluation results and the values of the generation rates ($cc/h/m^2$).

(Charge and Discharge Conditions)
Charge and discharge method: continuous charging and discharging at constant current
Current density: 70 ($mA/cm^2$)
End-of-charge voltage: 1.55 (V)/cell
End-of-discharge voltage: 1.00 (V)/cell
Temperature: room temperature (25° C.)

TABLE 1

| | | Sample No. | | | | | | | | | |
|---|---|---|---|---|---|---|---|---|---|---|---|
| | | 1-1 | 1-2 | 1-3 | 1-4 | 1-5 | 1-6 | 1-7 | 1-8 | 1-9 | 1-10 |
| Period 5 | Rb | 0.4 | 0.5 | 1 | 1.5 | 1 | 0.5 | 1 | 1 | 0.5 | 1 |
| | Sr | 0.3 | 0.5 | 0.5 | 0.4 | 0.3 | 0.5 | 0.3 | 0.4 | 0.5 | 0.5 |
| | Y | 0.4 | 0.5 | 0.2 | 0.3 | 0.3 | 0.2 | 0.3 | 0.2 | 0.3 | 0.5 |
| | Zr | 0.8 | 1 | 0.5 | 0.5 | 0.7 | 0.5 | 1 | 0.5 | 1 | 0.5 |
| | Nb | 0.5 | 1 | 0.5 | 0.8 | 0.5 | 1 | 0.5 | 0.7 | 0.6 | 0.5 |
| | Mo | 310 | 508 | 490 | 385 | 415 | 405 | 410 | 0.001> | 460 | 440 |
| | Tc | 0.2 | 0.5 | 0.5 | 0.3 | 0.2 | 0.1 | 0.3 | 0.5 | 0.4 | 0.4 |
| | Ru | 0.2 | 0.5 | 0.5 | 0.3 | 0.4 | 0.5 | 0.2 | 0.4 | 0.3 | 0.5 |
| | In | 2 | 4.5 | 2 | 0.5 | 0.5 | 0.5 | 0.5 | 1 | 0.001> | 1 |
| | Sn | 1 | 3 | 1 | 1 | 1 | 2 | 1 | 1 | 1 | 1 |

TABLE 1-continued

| | | | | | | | | | | | |
|---|---|---|---|---|---|---|---|---|---|---|---|
| Period 6 | Sb | 5 | 9 | 1 | 2 | 1 | 1 | 1 | 2 | 1 | 2 |
| | Te | 1.5 | 1 | 0.5 | 0.5 | 0.8 | 0.5 | 0.5 | 0.5 | 0.3 | 0.5 |
| | Cs | 0.5 | 1 | 0.5 | 0.4 | 0.3 | 0.4 | 0.5 | 0.5 | 0.3 | 0.4 |
| | Ba | 15 | 18 | 5 | 0.001> | 2 | 5 | 0.001> | 2 | 3 | 2 |
| | Hf | 0.5 | 1 | 0.5 | 0.2 | 0.4 | 0.2 | 0.5 | 0.4 | 0.5 | 0.5 |
| | Ta | 0.1 | 0.1 | 0.1 | 0.1 | 0.1 | 0.1 | 0.1 | 0.1 | 0.1 | 0.1 |
| | W | 25 | 28 | 10 | 8 | 0.001> | 7 | 0.001> | 6 | 5 | 6 |
| | Re | 3 | 4.5 | 1 | 2 | 1 | 0.001> | 0.001> | 1 | 1 | 1 |
| | Os | 0.3 | 0.5 | 0.2 | 0.2 | 0.3 | 0.2 | 0.5 | 0.4 | 0.2 | 0.3 |
| | Tl | 0.5 | 1 | 1 | 0.5 | 0.5 | 0.5 | 0.5 | 0.6 | 0.7 | 0.8 |
| | Pb | 5 | 7 | 1 | 0.8 | 1 | 1 | 1 | 0.5 | 0.5 | 1 |
| | Bi | 10 | 18 | 2 | 2 | 2 | 2 | 2 | 1 | 1 | 0.001> |
| Total | | 382.2 | 609.1 | 519.5 | 407.3 | 429.3 | 428.7 | 421.7 | 20.7 | 478.2 | 460.5 |
| Hydrogen generation rate | | Not occurred 4.0 | Not occurred 9.5 | Not occurred 8.5 | Not occurred 7.5 | Not occurred 7.2 | Not occurred 6.9 | Not occurred 5.5 | Not occurred 7.7 | Not occurred 8.0 | Not occurred 8.2 |
| Hydrogen sulfide generation rate | | Not occurred $3.5 \times 10^{-3}$ | Not occurred $4.9 \times 10^{-3}$ | Not occurred $4.0 \times 10^{-3}$ | Not occurred $3.6 \times 10^{-3}$ | Not occurred $3.3 \times 10^{-3}$ | Not occurred $3.1 \times 10^{-3}$ | Not occurred $2.5 \times 10^{-3}$ | Not occurred $3.7 \times 10^{-3}$ | Not occurred $3.9 \times 10^{-3}$ | Not occurred $3.9 \times 10^{-3}$ |

| | | Sample. No. | | | | | | | |
|---|---|---|---|---|---|---|---|---|---|
| | | 1-101 | 1-102 | 1-103 | 1-104 | 1-105 | 1-106 | 1-107 | 1-108 |
| Period 5 | Rb | 0.5 | 0.3 | 0.5 | 0.4 | 0.7 | 0.5 | 0.3 | 0.3 |
| | Sr | 0.2 | 0.3 | 0.2 | 0.1 | 0.5 | 0.4 | 0.2 | 0.5 |
| | Y | 0.1 | 0.2 | 0.1 | 0.5 | 0.6 | 0.5 | 0.3 | 0.3 |
| | Zr | 1 | 1.5 | 0.5 | 1 | 1.2 | 0.5 | 1.5 | 0.5 |
| | Nb | 0.8 | 0.5 | 0.3 | 0.8 | 0.2 | 0.4 | 0.5 | 0.4 |
| | Mo | 515 | 150 | 120 | 250 | 405 | 80 | 10 | 488 |
| | Tc | 0.1 | 0.2 | 0.1 | 0.3 | 0.1 | 0.2 | 0.1 | 0.3 |
| | Ru | 0.2 | 0.1 | 0.1 | 0.2 | 0.1 | 0.1 | 0.2 | 0.3 |
| | In | 3 | 6 | 1 | 0.5 | 1 | 1 | 0.5 | 4 |
| | Sn | 4 | 1 | 2 | 1 | 4 | 5 | 1 | 21 |
| | Sb | 2 | 1 | 11 | 1 | 2 | 5 | 1 | 7 |
| | Te | 1 | 0.5 | 0.5 | 1.2 | 1 | 0.8 | 1 | 2 |
| Period 6 | Cs | 0.5 | 0.4 | 0.5 | 0.3 | 0.7 | 0.4 | 0.5 | 0.5 |
| | Ba | 5 | 2 | 10 | 21 | 5 | 10 | 3 | 10 |
| | Hf | 0.5 | 0.4 | 0.2 | 0.5 | 0.4 | 0.6 | 0.3 | 0.5 |
| | Ta | 0.1 | 0.1 | 0.1 | 0.1 | 0.1 | 0.1 | 0.1 | 0.1 |
| | W | 5 | 3 | 5 | 2 | 32 | 8 | 5 | 20 |
| | Re | 1 | 1 | 2 | 1 | 1 | 6 | 1 | 3 |
| | Os | 0.3 | 0.2 | 0.1 | 0.3 | 0.4 | 0.5 | 0.1 | 0.8 |
| | Tl | 1 | 1 | 0.5 | 0.5 | 1 | 1 | 0.5 | 1 |
| | Pb | 2 | 3 | 8 | 2 | 15 | 10 | 15 | 40 |
| | Bi | 5 | 2 | 3 | 10 | 1 | 10 | 21 | 12 |
| Total | | 548.3 | 174.7 | 165.7 | 294.7 | 473 | 141 | 63.1 | 612.5 |
| Hydrogen generation rate | | Occurred 10.6 | Occurred 11.0 | Occurred 13.5 | Not occurred 6.6 | Not occurred 5.1 | Occurred 13.2 | Occurred 14.8 | Occurred 10.5 |
| Hydrogen sulfide generation rate | | Occurred $7.0 \times 10^{-3}$ | Not occurred $1.3 \times 10^{-3}$ | Not occurred $1.4 \times 10^{-3}$ | Occurred $6.5 \times 10^{-3}$ | Occurred $5.8 \times 10^{-3}$ | Not occurred $0.9 \times 10^{-3}$ | Not occurred $0.7 \times 10^{-3}$ | Occurred $5.1 \times 10^{-3}$ |

As shown in Table 1, when the impurity element ions that can be contained in the electrolytes satisfy all of (1) to (8) described below, gas generation can be reduced during repeated charging-discharging operations. In this test, the generation of hydrogen and hydrogen sulfide in the negative electrode can be effectively reduced.

(1) The total concentration of ions of elements of groups 1 to 8 and ions of elements of groups 13 to 16 in the fifth period of the periodic table, and ions of elements of groups 1, 2, and 4 to 8 and ions of elements of groups 13 to 15 in the sixth period of the periodic table is 610 mg/L or less.

(2) The concentration of barium ions is 20 mg/L or less.

(3) The concentration of molybdenum ions is 510 mg/L or less.

(4) The concentration of tungsten ions is 30 mg/L or less.

(5) The concentration of rhenium ions is 5 mg/L or less.

(6) The concentration of indium ions is 5 mg/L or less.

(7) The concentration of antimony ions is 10 mg/L or less.

(8) The concentration of bismuth ions is 20 mg/L or less.

It is found that, in contrast, when none of (1) to (8) described above are satisfied, a gas such as hydrogen or hydrogen sulfide is easily generated.

This test showed that gas generation could be reduced by treating the element ions specified in (1) to (8) above as impurity element ions involved in gas generation due to, for example, a side reaction of the battery reaction, and adjusting the concentrations of the impurity element ions to the specific ranges. In particular, this test shows that the concentrations of ions of the elements of the gas generation impurity element group in the electrolytes are preferably adjusted to the specific ranges before operation of the flow battery system (in an unused state). From this point of view, it is considered to be preferable to adjust the concentrations within a short period of use after the start of operation of the flow battery system (for example, within about 100 cycles in a battery with a capacity of 10 kWh or more, though the period depends on the capacity of the flow battery or the like). Furthermore, during and after charging and discharging of the flow battery system, there is a possibility that the concentration of ions of at least one of the elements of the gas generation impurity element group in the electrolyte will change. Therefore, for example, the removal operation described above may be performed at an appropriate time.

The present invention is not limited to the examples described above but is defined by the appended claims. The present invention is intended to cover all the modifications within the meaning and scope equivalent to those of the claims. For example, in the test example described above, the type and concentration of active material, the type of acid and acid concentration of the electrolyte for each electrode, the amount of the electrolyte, the size of the electrodes, the capacity of the flow battery, and the like can be appropriately changed.

The invention claimed is:

1. A flow battery system comprising:
   an electrolyte for a flow battery; and
   the flow battery to which the electrolyte being supplied,
   wherein, in the electrolyte, a total concentration of ions of elements of groups 1 to 8 and ions of elements of groups 13 to 16 in the fifth period of the periodic table, and ions of elements of groups 1, 2, and 4 to 8 and ions of elements of groups 13 to 15 in the sixth period of the periodic table is 610 mg/L or less, the ions being impurity element ions involved in generation of a gas containing elemental hydrogen,
   a concentration of vanadium ions is 1 mol/L or more and 3 mol/L or less,
   a concentration of free sulfuric acid is 1 mol/L or more and 4 mol/L or less,
   a concentration of phosphoric acid is $1.0 \times 10^{-4}$ mol/L or more and $7.1 \times 10^{-1}$ mol/L or less,
   a concentration of ammonium is 20 mg/L or less,
   a concentration of silicon is 40 mg/L or less,
   a concentration of rhenium ions is 0.001 mg/L or more and 5 mg/L or less, and
   when a charging and discharging test is performed by circulating and supplying the electrolyte to the flow battery under conditions below, a generation rate of hydrogen is less than 10 cc/h/m$^2$ and a generation rate of hydrogen sulfide is less than $5.0 \times 10^{-3}$ cc/h/m$^2$, the hydrogen and the hydrogen sulfide being generated in a negative electrode of the flow battery during charging and discharging,
   (Charge and discharge conditions):
   Charge and discharge method: continuous charging and discharging at constant current;
   Current density: 70 (mA/cm$^2$);
   End-of-charge voltage: 1.55 (V)/cell;
   End-of-discharge voltage: 1.00 (V)/cell; and
   Temperature: room temperature (25° C.).

2. The flow battery system according to claim 1, wherein a concentration of barium ions is 20 mg/L or less.

3. The flow battery system according to claim 1, wherein a concentration of molybdenum ions is 510 mg/L or less.

4. The flow battery system according to claim 1, wherein a concentration of tungsten ions is 30 mg/L or less.

5. The flow battery system according to claim 1, wherein a concentration of indium ions is 5 mg/L or less.

6. The flow battery system according to claim 1, wherein a concentration of antimony ions is 10 mg/L or less.

7. The flow battery system according to claim 1, wherein a concentration of bismuth ions is 20 mg/L or less.

8. The flow battery system according to claim 1, wherein
   a concentration of barium ions is 20 mg/L or less,
   a concentration of molybdenum ions is 510 mg/L or less, and
   a concentration of tungsten ions is 30 mg/L or less.

9. The flow battery system according to claim 1, wherein
   a concentration of molybdenum ions is 510 mg/L or less,
   a concentration of indium ions is 5 mg/L or less,
   a concentration of antimony ions is 10 mg/L or less, and
   a concentration of bismuth ions is 20 mg/L or less.

10. The flow battery system according to claim 1, wherein
    a concentration of barium ions is 0.001 mg/L or more 20 mg/L or less, and
    a concentration of tungsten ions is 0.001 mg/L or more 30 mg/L or less.

11. A flow battery system comprising:
    an electrolyte for a flow battery; and
    the flow battery to which the electrolyte being supplied,
    wherein, in the electrolyte, a total concentration of ions of elements of groups 1 to 8 and ions of elements of groups 13 to 16 in the fifth period of the periodic table, and ions of elements of groups 1, 2, and 4 to 8 and ions of elements of groups 13 to 15 in the sixth period of the periodic table is 610 mg/L or less, the ions being impurity element ions involved in generation of a gas containing elemental hydrogen,
    a concentration of vanadium ions is 1 mol/L or more and 3 mol/L or less,
    a concentration of free sulfuric acid is 1 mol/L or more and 4 mol/L or less,
    a concentration of phosphoric acid is $1.0 \times 10^{-4}$ mol/L or more and $7.1 \times 10^{-1}$ mol/L or less,
    a concentration of ammonium is 20 mg/L or less,
    a concentration of silicon is 40 mg/L or less,
    a concentration of tungsten ions is 0.001 mg/L or more and 30 mg/L or less, and
    when a charging and discharging test is performed by circulating and supplying the electrolyte to the flow battery under conditions below, a generation rate of hydrogen is less than 10 cc/h/m$^2$ and a generation rate of hydrogen sulfide is less than $5.0 \times 10^{-3}$ cc/h/m$^2$, the hydrogen and the hydrogen sulfide being generated in a negative electrode of the flow battery during charging and discharging,
    (Charge and discharge conditions):
    Charge and discharge method: continuous charging and discharging at constant current;
    Current density: 70 (mA/cm$^2$);
    End-of-charge voltage: 1.55 (V)/cell;
    End-of-discharge voltage: 1.00 (V)/cell; and
    Temperature: room temperature (25° C.).

12. The flow battery system according to claim 11, wherein a concentration of barium ions is 20 mg/L or less.

13. The flow battery system according to claim 11, wherein a concentration of molybdenum ions is 510 mg/L or less.

14. The flow battery system according to claim 11, wherein a concentration of rhenium ions is 5 mg/L or less.

15. The flow battery system according to claim 11, wherein a concentration of indium ions is 5 mg/L or less.

16. The flow battery system according to claim 11, wherein a concentration of antimony ions is 10 mg/L or less.

17. The flow battery system according to claim 11, wherein a concentration of bismuth ions is 20 mg/L or less.

18. The flow battery system according to claim 11, wherein
a concentration of barium ions is 20 mg/L or less,
a concentration of molybdenum ions is 510 mg/L or less, and
a concentration of rhenium ions is 5 mg/L or less.

19. The flow battery system according to claim 11, wherein
a concentration of molybdenum ions is 510 mg/L or less,
a concentration of rhenium ions is 5 mg/L or less,
a concentration of indium ions is 5 mg/L or less,
a concentration of antimony ions is 10 mg/L or less, and
a concentration of bismuth ions is 20 mg/L or less.

20. A flow battery system comprising:
an electrolyte for a flow battery; and
the flow battery to which the electrolyte being supplied,
wherein, in the electrolyte, a total concentration of ions of elements of groups 1 to 8 and ions of elements of groups 13 to 16 in the fifth period of the periodic table, and ions of elements of groups 1, 2, and 4 to 8 and ions of elements of groups 13 to 15 in the sixth period of the periodic table is 610 mg/L or less, the ions being impurity element ions involved in generation of a gas containing elemental hydrogen,
a concentration of vanadium ions is 1 mol/L or more and 3 mol/L or less,
a concentration of free sulfuric acid is 1 mol/L or more and 4 mol/L or less,
a concentration of phosphoric acid is $1.0 \times 10^{-4}$ mol/L or more and $7.1 \times 10^{-1}$ mol/L or less,
a concentration of ammonium is 20 mg/L or less,
a concentration of silicon is 40 mg/L or less,
a concentration of barium ions is 0.001 mg/L or more and 20 mg/L or less, and
when a charging and discharging test is performed by circulating and supplying the electrolyte to the flow battery under conditions below, a generation rate of hydrogen is less than 10 cc/h/m$^2$ and a generation rate of hydrogen sulfide is less than $5.0 \times 10^{-3}$ cc/h/m$^2$, the hydrogen and the hydrogen sulfide being generated in a negative electrode of the flow battery during charging and discharging,
(Charge and discharge conditions):
Charge and discharge method: continuous charging and discharging at constant current;
Current density: 70 (mA/cm$^2$);
End-of-charge voltage: 1.55 (V)/cell;
End-of-discharge voltage: 1.00 (V)/cell; and
Temperature: room temperature (25° C.).

* * * * *